(12) United States Patent
Alvidrez

(10) Patent No.: US 7,850,440 B2
(45) Date of Patent: Dec. 14, 2010

(54) DOUGH SHAPING DEVICE AND KIT

(76) Inventor: Norman Alvidrez, 1948 Kings Rd., Hanford, CA (US) 93230

( * ) Notice: Subject to any disclaimer, the term of this patent is extended or adjusted under 35 U.S.C. 154(b) by 60 days.

(21) Appl. No.: 12/392,139

(22) Filed: Feb. 25, 2009

(65) Prior Publication Data
US 2009/0214691 A1   Aug. 27, 2009

Related U.S. Application Data

(60) Provisional application No. 61/031,228, filed on Feb. 25, 2008.

(51) Int. Cl.
*A21C 11/00* (2006.01)
(52) U.S. Cl. .................. 425/195; 269/302.1; 425/374; 425/470
(58) Field of Classification Search .............. 425/374, 425/458, 470, 195; 269/16, 290, 294, 302.1
See application file for complete search history.

(56) References Cited

U.S. PATENT DOCUMENTS

| | | | | |
|---|---|---|---|---|
| 624,797 | A | * | 5/1899 | Harris ...................... 269/302.1 |
| 830,764 | A | * | 9/1906 | Braymer .................. 269/302.1 |
| 1,099,822 | A | * | 6/1914 | Sager ...................... 269/302.1 |
| 1,375,399 | A | * | 4/1921 | Leonard ....................... 241/95 |
| 2,493,854 | A | * | 1/1950 | Brainard .................... 249/112 |
| 2,521,982 | A | * | 9/1950 | Kors .......................... 425/374 |
| 4,009,857 | A | | 3/1977 | Delmas |
| 5,667,821 | A | * | 9/1997 | Castaneda .................. 425/218 |
| 2004/0031399 | A1 | * | 2/2004 | Christy ........................ 99/485 |

FOREIGN PATENT DOCUMENTS

GB    2427344    12/2006

* cited by examiner

*Primary Examiner*—James Mackey
(74) *Attorney, Agent, or Firm*—James Ray & Assoc

(57) ABSTRACT

A dough shaping device includes a base manufactured from a first predetermined material and having a first predetermined size and a substantially flat upper surface for supporting a predetermined amount of dough. A rolling pin support member is manufactured from a second predetermined material and having a second predetermined size and first predetermined shape and is disposed at a first end of such base member. A dough template is manufactured from a third predetermined material and has a second predetermined shape and a third predetermined size and a predetermined thickness. At least one aperture having a third predetermined shape and a fourth predetermined size is formed through such dough template.

8 Claims, 6 Drawing Sheets

DOUGH SHAPING DEVICE AND KIT

CROSS REFERENCE TO RELATED APPLICATION

This patent application is related to and claims priority from U.S. Provisional Patent Application Ser. No. 61/031,228 filed Feb. 25, 2008.

FIELD OF THE INVENTION

The present invention relates, in general, to dough molds and, more particularly, this invention relates to a device and kit for use in molding and shaping dough, such as pie crust dough, pastry dough, and cookie dough, into predetermined shapes and sizes.

BACKGROUND OF THE INVENTION

Prior to the conception and development of the present invention, dough, as is generally well known in the prior art, has been used to make pastries, pie crusts, cookies, and the like. However, it may be difficult for an individual to handle such dough and form it into uniform shapes and sizes for preparing pastries and desserts. Generally, an individual making such pastries and desserts uses a rolling pin to roll out the dough. Unfortunately, the dough may be rolled too thin, too thick, in too large of a circle or other shape, or in to small or a circle or other shape, thereby resulting in over handling of such dough, loss of time, wasted ingredients, and poor quality pastries and desserts.

Specifically of interest to the present invention are the following: Delmas, U.S. Pat. No. 4,009,857, discloses a pie crust dough roll out and trimming mold assembly which includes a flat base element having a roll out surface and an array of apertures therein for accommodating various size ring mold elements having cooperating protuberances extending from the bottom surfaces of the rings. The ring elements have narrow top surface areas for pinching off excess pie crust dough during the rolling out process and wide bottom surfaces for stability.

Sleator, Great Britain Patent No. GB2,427,344, discloses a template with cut-outs used for forming thin biscuit dough onto a non-stick sheet. The non-stick sheet is placed on a flat surface, the template is placed on top of the sheet, a dough mass is dragged across the surface of the template so that the dough fills the cut-outs and shaped dough is formed. A second piece of non-stick paper or plastic is placed on top of the shaped dough. The formed dough is then frozen.

SUMMARY OF THE INVENTION

The present invention provides a dough shaping device. Such dough shaping device includes a base manufactured from a first predetermined material and having a first predetermined size and a substantially flat upper surface for supporting a predetermined amount of dough. A rolling pin support member is manufactured from a second predetermined material and has a second predetermined size and a first predetermined shape and is disposed at a first end of such base member. A dough template is manufactured from a third predetermined material and has a second predetermined shape and a third predetermined size and a predetermined thickness. At least one aperture having a third predetermined shape and a fourth predetermined size is formed through such dough template.

According to another embodiment, a dough shaping kit includes a dough shaping device and a rolling pin. Such dough shaping device includes a base manufactured from a first predetermined material and having a first predetermined size and a substantially flat upper surface for supporting a predetermined amount of dough, a rolling pin support member manufactured from a second predetermined material and having a second predetermined size and first predetermined shape disposed at a first end of said base member, a dough template manufactured from a third predetermined material and having a second predetermined shape and a third predetermined size and a predetermined thickness, and at least one aperture having a third predetermined shape and a fourth predetermined size formed through such dough template. Such rolling pin is for at least one of rolling such dough, shaping such dough and a combination thereof at least one of on such base member, on such dough template, within such at least one aperture disposed through such dough template, and a combination thereof.

OBJECTS OF THE INVENTION

It is, therefore, one of the primary objects of the present invention to provide a device for use in preparing pastry dough, such device enabling a user to accurately roll dough into a predetermined shape, a predetermined size and a predetermined thickness.

Another object of the present invention is to provide a device for use in creating consistently sized and shaped crusts for pies and other pastries.

Still another object of the present invention is to provide a device which is easy to use and which includes a plurality of templates for use in rolling pie, pastry, and cookie dough into different predetermined shapes, sizes, and thicknesses.

Yet another object of the present invention is to provide an easy to use kit which includes a rolling pin, a surface upon which dough can be rolled, and a plurality of templates for limiting at least one of the final size of the dough once it has been rolled, the final shape of the dough once it has been rolled, the final thickness of the dough once it has been rolled, and a combination thereof.

An additional object of the present invention is to provide a device which includes a plurality of interchangeable templates for connecting to such device for enabling a user to shape predetermined dough into predetermined shapes, sizes, and thicknesses.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
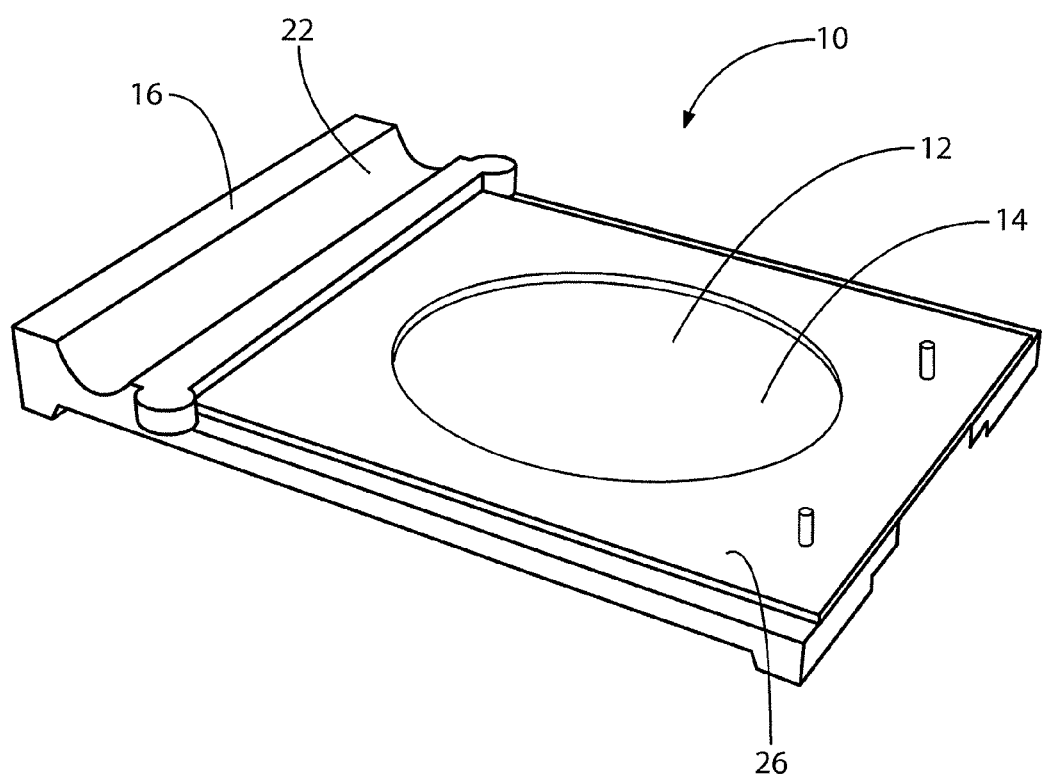
FIG. 1 is a partial perspective view of the invention according to one embodiment of the invention.
Figure 2:
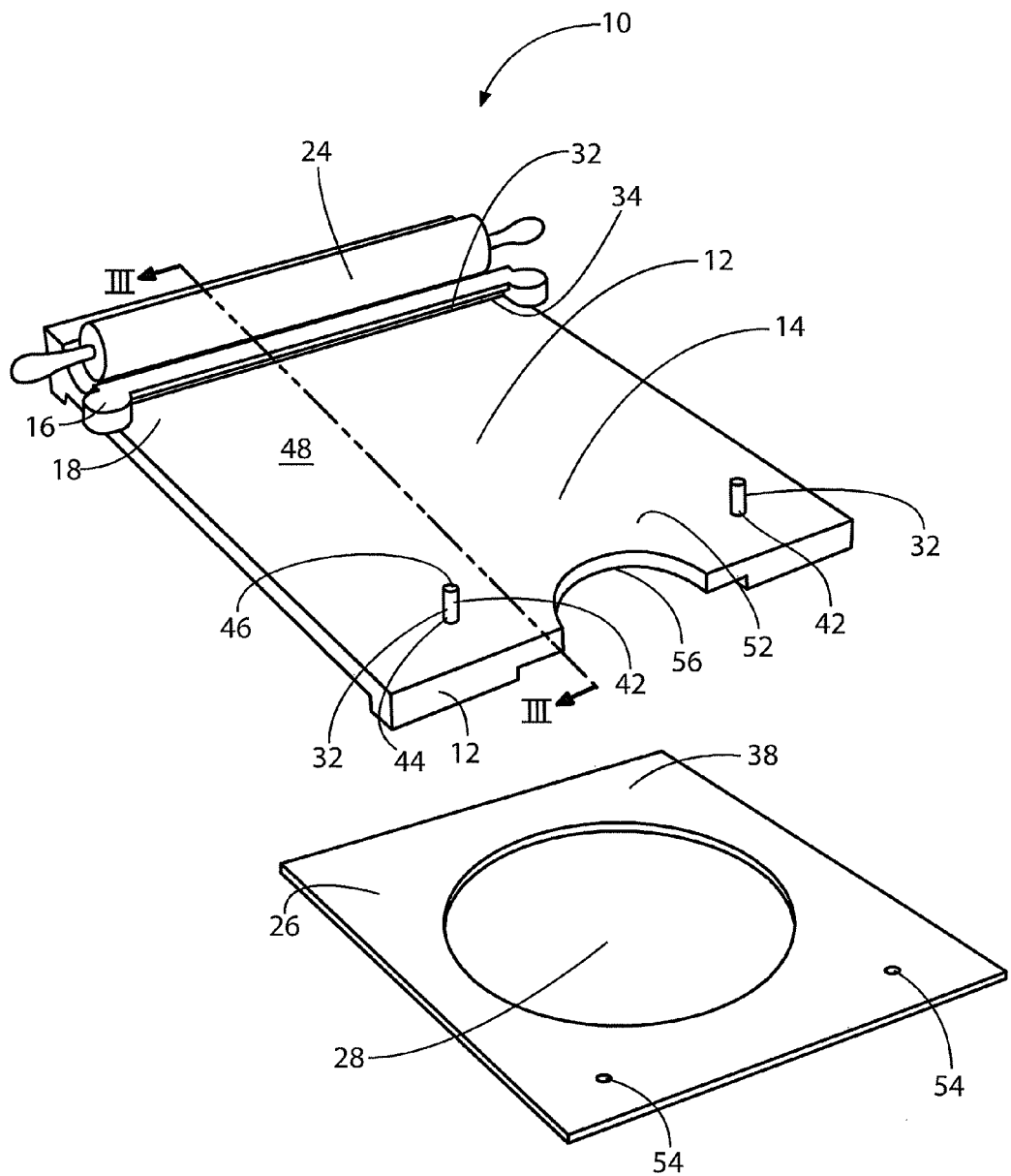
FIG. 2 is a partial perspective view of the invention according to one embodiment of the invention in which a rolling pin is cradled on the rolling pin support member and in which the dough template is illustrated beside the base.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Reference is now made, more particularly, to FIGS. 1-6.

Referring to FIGS. 1-4, the present invention provides a dough shaping device, generally designated 10. Such dough shaping device includes a base 12 manufactured from a first predetermined material and having a first predetermined size and a substantially flat upper surface 14 for supporting a predetermined amount of dough (not shown). It is presently preferred that such first predetermined material is at least one of plastic, metal wood, and a combination thereof. It is most preferred that such first predetermined material is plastic.

A rolling pin support member 16 is manufactured from a second predetermined material and has a second predetermined size and first predetermined shape and is disposed at a first end 18 of such base member 12. Such rolling pin support member and such base member may be integrally formed. It is presently preferred that such rolling pin support member 16 includes a concave center portion 22 having a predetermined radius for cradling a rolling pin 24 longitudinally therein. It is presently preferred that such second predetermined material is at least one of plastic, metal wood, and a combination thereof. It is most preferred that such second predetermined material is plastic.

A dough template 26 is manufactured from a third predetermined material and has a second predetermined shape and a third predetermined size and a predetermined thickness. It is presently preferred that such second predetermined shape is substantially rectangular. It is presently preferred that such third predetermined material is at least one of plastic, metal wood, and a combination thereof. It is most preferred that such third predetermined material is plastic.

At least one aperture 28 having a third predetermined shape and a fourth predetermined size is formed through such dough template 26.

Figure 3:
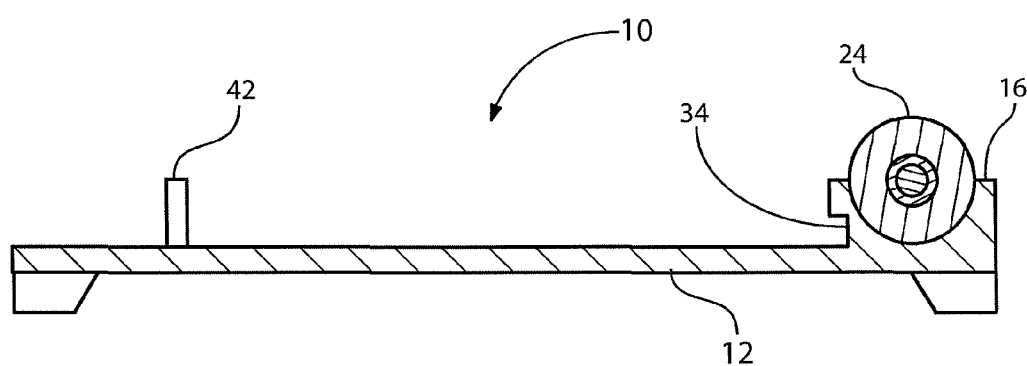
FIG. 3 is a partial perspective cross-sectional view of the invention taken along the lines III-III of FIG. 2.
Figure 4:
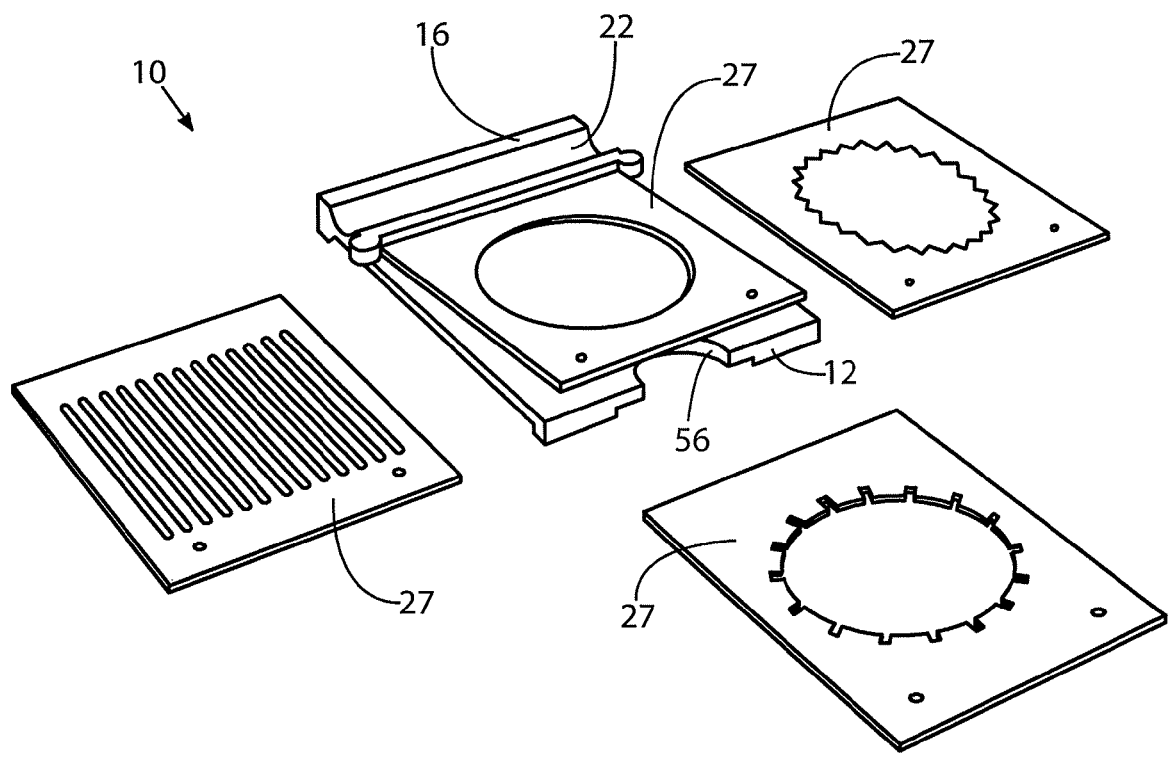
FIG. 4 is a partial perspective view of the invention according to one embodiment of the invention in which the invention includes a plurality of dough templates.

It is presently preferred that such device 10 further includes a plurality of dough templates 27. As can be seen in FIG. 3 such dough templates 27 may be used to shape dough to conform to various shapes, sizes, and thicknesses.

It is further presently preferred that such dough shaping device 10 includes a securing means 32 disposed on at least one of such base 12, such dough template 26, such rolling pin support member 16, and a combination thereof for securing such dough template 26 to such base 12 such that such predetermined amount of dough may be supported by such base and manipulated to conform to such at least one aperture.

It is presently preferred that such securing means 32 is at least one of a tongue and groove type securing means, a dowel and aperture type securing means, and a combination thereof. It is presently most preferred that such securing means 32 includes a groove 34 disposed longitudinally along such rolling pin support member 16 for receiving a first predetermined end 38 of such dough template 26. It is further presently preferred that such base member 12 includes at least one dowel rod 42 having a first end 44 and a second end 46 and wherein such first end 44 is attached perpendicularly to an upper surface 48 of such base member 12 closely adjacent a second end 52 thereof and wherein such dough template 26 further includes at least one second aperture 54 disposed there through for receiving such second end 46 of such at least one dowel rod 42 there through. It is further presently preferred that such base member 12 includes at least two dowel rods disposed thereon and such dough template 26 includes at least two apertures disposed there through for mating engagement with such at least two dowel rods.

It is further presently preferred that such base further include a cut out portion 56 disposed on such second end 52 thereof.

Figure 5:
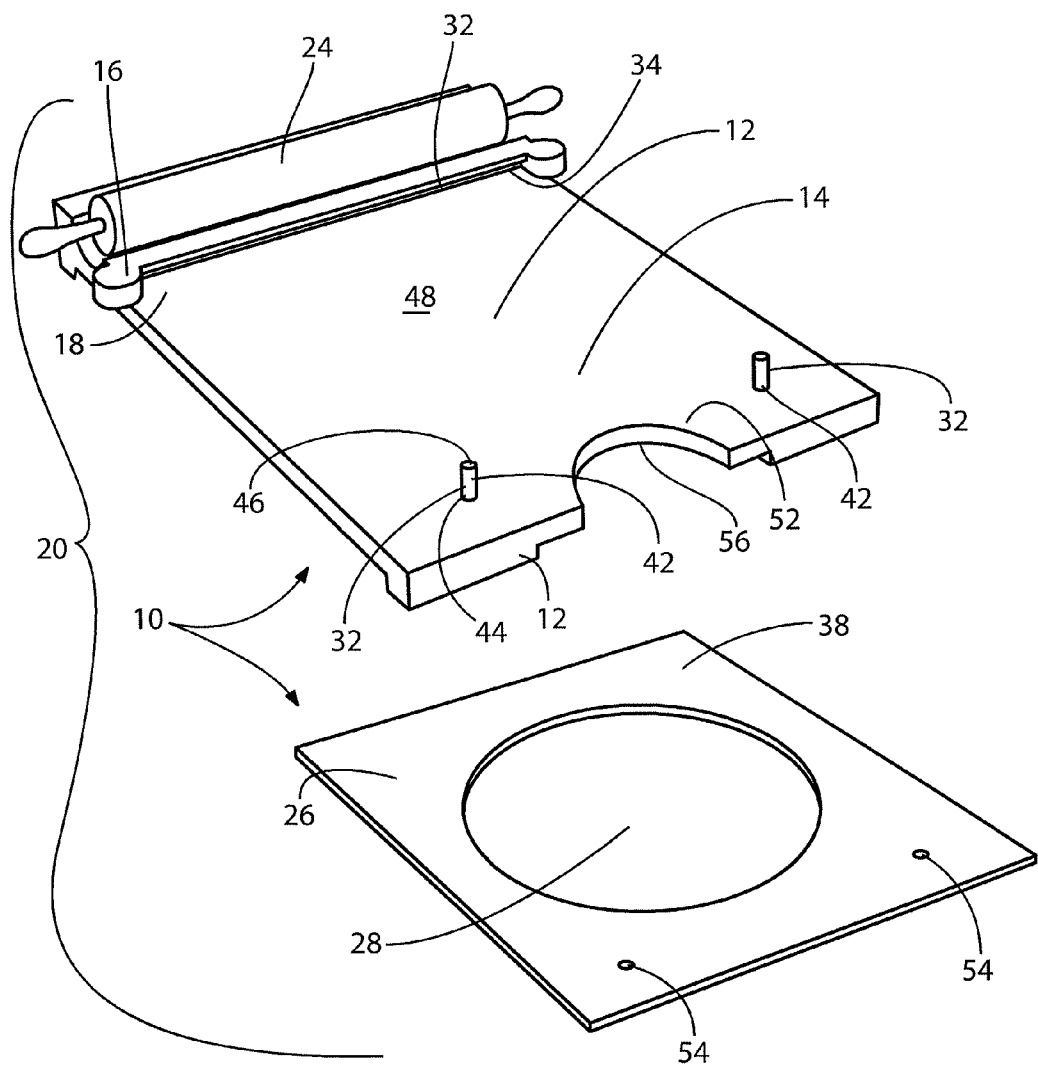
FIG. 5 is a partial perspective view of the invention according to one embodiment of the invention.
Figure 6:
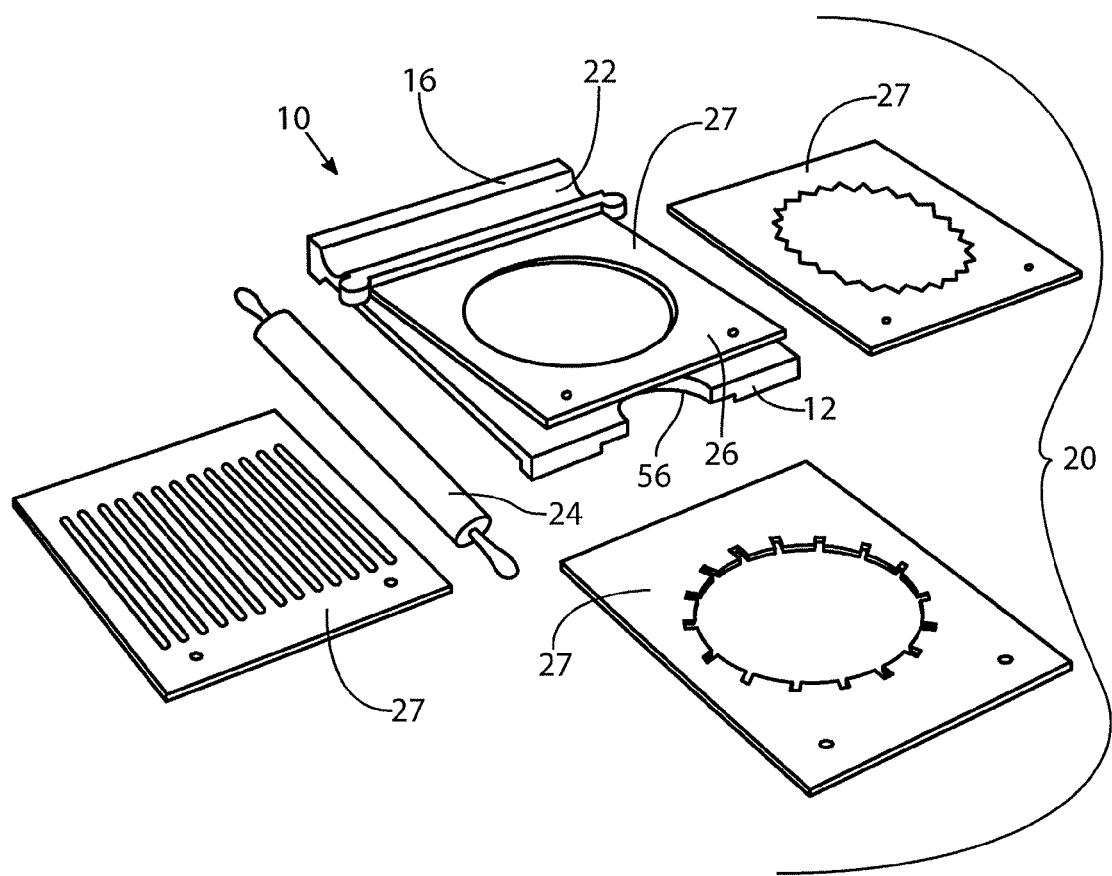
FIG. 6 is a partial perspective view of the invention according to one embodiment of the invention.

According to another embodiment, referring to FIGS. 5-6, a dough shaping kit, generally designated 20, includes a dough shaping device, generally designated 10, and a rolling pin 24.

Such dough shaping device 10 includes a base 12 manufactured from a first predetermined material and having a first predetermined size and a substantially flat upper surface 14 for supporting a predetermined amount of dough (not shown), a rolling pin support member 16 manufactured from a second predetermined material and having a second predetermined size and first predetermined shape disposed at a first end 18 of such base member 12 and preferably including a concave center portion 22 having a predetermined radius for cradling such rolling pin 24 longitudinally therein, a dough template 26 manufactured from a third predetermined material and having a second predetermined shape and a third predetermined size and a predetermined thickness, and at least one aperture 28 having a third predetermined shape and a fourth predetermined size formed through such dough template.

Such rolling pin 24 is for at least one of rolling such dough, shaping such dough and a combination thereof at least one of on such base member 12, on such dough template 26, within such at least one aperture 28 disposed through such dough template 26, and a combination thereof.

It is presently preferred that such dough shaping device 20 includes a plurality of dough templates 27.

It is further presently preferred that such dough shaping device 10 includes a securing means 32 disposed on at least one of such base 12, such dough template 26, such rolling pin support member 16, and a combination thereof for securing such dough template 26 to such base 12 such that such predetermined amount of dough may be supported by such base and manipulated to conform to such at least one aperture.

It is presently preferred that such securing means 32 is at least one of a tongue and groove type securing means, a dowel and aperture type securing means, and a combination thereof. It is presently most preferred that such securing means 32 includes a groove 34 disposed longitudinally along such rolling pin support member 16 for receiving a first predetermined end 38 of such dough template 26. It is further presently preferred that such base member 12 includes at least one dowel rod 42 having a first end 44 and a second end 46 and wherein such first end 44 is attached perpendicularly to an upper surface 48 of such base member 12 closely adjacent a second end 52 thereof and wherein such dough template 26 further includes at least one second aperture 54 disposed there through for receiving such second end 46 of such at least one dowel rod 42 there through. It is further presently preferred that such base member 12 includes at least two dowel rods disposed thereon and such dough template 26 includes at least two apertures disposed there through for mating engagement with such at least two dowel rods.

It is further presently preferred that such base further includes a cut out portion 56 disposed on such second end 52 thereof.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:

1. A dough shaping device comprising:
   a. a base member manufactured from a first predetermined material and having a first predetermined size and a substantially flat upper surface for supporting a predetermined amount of dough;
   b. a rolling pin support member, manufactured from a second predetermined material and having a second predetermined size and first predetermined shape, disposed at a first end of said base member;
   c. at least one dough template manufactured from a third predetermined material and having a second predetermined shape and a third predetermined size and a predetermined thickness;
   d. at least one aperture having a third predetermined shape and a fourth predetermined size formed through said dough template; and
   e. a groove disposed longitudinally along said rolling pin support member for receiving a first predetermined end of said dough template.

2. A dough shaping device according to claim 1 wherein said base member includes at least one dowel rod having a first end and a second end and wherein said first end of said dowel rod is attached perpendicularly to an upper surface of said base member adjacent a second end thereof and wherein said dough template further includes at least one second aperture disposed there through for receiving said second end of said at least one dowel rod there through.

3. A dough shaping device according to claim 2 wherein said base member includes at least two dowel rods disposed thereon and said dough template includes at least two apertures disposed there through for mating engagement with said at least two dowel rods.

4. A dough shaping device according to claim 1 wherein said first predetermined material is at least one of plastic, metal, wood, and a combination thereof.

5. A dough shaping kit comprising:
   a. a dough shaping device including;
      i. a base member manufactured from a first predetermined material and having a first predetermined size and a substantially flat upper surface for supporting a predetermined amount of dough;
      ii. a rolling pin support member, manufactured from a second predetermined material and having a second predetermined size and first predetermined shape, disposed at a first end of said base member;
      iii. at least one dough template manufactured from a third predetermined material and having a second predetermined shape and a third predetermined size and a predetermined thickness;
      iv. at least one aperture having a third predetermined shape and a fourth predetermined size formed through said dough template;
      v. a groove disposed longitudinally along said rolling pin support member for receiving a first predetermined end of said dough template; and
   b. a rolling pin for at least one of rolling such dough, shaping such dough and a combination thereof at least one of on said base member, on said dough template, within said at least one aperture disposed through said dough template, and a combination thereof.

6. A dough shaping kit according to claim 5 wherein said dough shaping device further includes a securing means disposed on at least one of said base member, said dough template, said rolling pin support member, and a combination thereof for securing said dough template to said base member such that such predetermined amount of dough may be supported by said base member and manipulated to conform to said at least one aperture.

7. A dough shaping kit according to claim 5 wherein said base member includes at least one dowel rod having a first end and a second end and wherein said first end of said dowel rod is attached perpendicularly to an upper surface of said base member closely adjacent a second end thereof and wherein said dough template further includes at least one second aperture disposed there through for receiving said second end of said at least one dowel rod there through.

8. A dough shaping kit according to claim 5 wherein said base member includes at least two dowel rods disposed thereon and said dough template includes at least two apertures disposed there through for mating engagement with said at least two dowel rods.

* * * * *